(12) United States Patent
Krause et al.

(10) Patent No.: US 7,536,901 B2
(45) Date of Patent: May 26, 2009

(54) SPM SENSOR

(75) Inventors: Oliver Krause, Erlangen (DE);
Christoph Lehrer, Ashfeld (DE); Silke Petersen, Nürnberg (DE)

(73) Assignee: NanoWorld AG, Neuchâtel (CH)

( * ) Notice: Subject to any disclaimer, the term of this patent is extended or adjusted under 35 U.S.C. 154(b) by 720 days.

(21) Appl. No.: 11/283,325

(22) Filed: Nov. 18, 2005

(65) Prior Publication Data

US 2006/0123894 A1 Jun. 15, 2006

(30) Foreign Application Priority Data

Dec. 14, 2004 (EP) .................................. 04029525

(51) Int. Cl.
*G12B 21/08* (2006.01)
(52) U.S. Cl. ........................................ 73/105; 73/866.5
(58) Field of Classification Search .................... 73/105
See application file for complete search history.

(56) References Cited

U.S. PATENT DOCUMENTS 5,900,729 A * 5/1999 Moser et al. ................. 324/244

FOREIGN PATENT DOCUMENTS

| DE | 198 25 404 | 12/1999 |
| EP | 1 278 055 | 1/2003 |
| WO | WO 00/19494 | 4/2000 |

OTHER PUBLICATIONS

Cheung, C.L. et al., "Carbon Nanotube Atomic Force Microscopy Tips: Direct growth by Chemical Vapor Deposition and Application to High-Resolution Imaging", Proceedings of the National Academy of Sciences (PNAS), vol. 97, No. 8, Apr. 11, 2000, pp. 3809-3813.*
"New Scanning Tunneling Microscopy . . . ", By Akama et al., published by Journal of Vacuum Science & Technology, (1990), pp. 429-433.

* cited by examiner

*Primary Examiner*—Daniel S Larkin
(74) *Attorney, Agent, or Firm*—Bachman & LaPointe, P.C.

(57) ABSTRACT

An SPM sensor (1) for a scanning probe microscope with a cantilever (3), a holding element (2) at one end of the cantilever (3) and a sensor tip (4) at the other end of the cantilever (3) and to a method for producing sensors of this type. The electron beam induced deposition (EBID or, shorter, EBD) structure (5) is anchored directly in the substrate of the sensor tip (4). The anchoring of the EBD structure (5) takes place with positive and nonpositive engagement in a hole (6) in the sensor tip (4), which is created by material removal in the substrate of the sensor tip (4). The method comprises the creation of the EBD structure by particle beam induced material deposition in the hole of the sensor tip.

4 Claims, 2 Drawing Sheets

SPM SENSOR

BACKGROUND OF THE INVENTION

The invention relates to an SPM sensor for a scanning probe microscope with a cantilever, a holding element at one end of the cantilever and a sensor tip at the other end of the cantilever and with an at least partially cylindrical electron beam induced deposition (EBID or, shorter, EBD) scanning tip protruding from the sensor tip, and also to a method for producing sensors of this type.

Scanning probe microscopes are generally known and are used in practice to scan the surfaces of specimens with fine sensors up to atomic resolution. Scanning probe microscopes (SPM) also include atomic force microscopes (AFM) and scanning tunneling microscopes (STM), which are likewise generally known. Scanning probe microscopes use sensors which comprise a microcantilever, referred to hereafter as the cantilever, which has at its one end a holding element and at the other end a sensor tip, with which the specimen is scanned. In the case of scanning probe microscopy, the scanning tip is brought up closer to the surface under investigation until the probe interacts with the surface under investigation. On account of the atomic forces acting between the scanning tip and the surface, the cantilever of the sensor is deflected. The detection of this flexural distortion makes it possible to measure the topography and other properties of the surface of the specimen.

The resolution is determined here by the form of the probe tip that interacts with the surface of the specimen during the measurement. The result of the measurement with the scanning probe microscope is always a convolution of the form of the SPM sensor and the actual form of the surface of the specimen. As a result of the manufacturing process, the sensor tip is of a pyramidal, conical or cylindrical form and generally has a height of a few (typically 5-20) micrometers and a typical aperture angle of 20 to 70 degrees. The maximum resolving power of sensors of this type when measuring the topography of a surface of a specimen lies in the range of below one nanometer to several nanometers. Owing to the geometry of the SPM sensors, it is therefore not possible, in particular in the case of specimens with a pronounced topography and structures with a high aspect ratio, to reproduce the actual form of the surface. For the detection of fine structures and indentations, the resolving power of a sensor can be significantly improved by reducing the size of the aperture angle of the sensor tip. It is known to reduce the size of the effective aperture angle of the sensor tip by depositing an additional scanning tip in needle form, referred to hereafter as the EBD scanning tip, on the lateral surface of the sensor tip, and in this way improve the resolving power. This specially formed EBD scanning tip is produced by bombarding the probe tip with electrons in a vacuum and the deposition of material thereby induced (contamination, gas atoms or molecules, usually carbon or organic carbon compounds) at the location irradiated by the electrons. This effect is referred to as electron beam induced deposition (EBID or, shorter, EBD) and has already been the subject of many publications.

When scanning the surface of a specimen with the probe or with the EBD scanning tip, great forces act on the EBD scanning tip. In order to withstand the forces, and obtain a long service life of the grown-on tip, the EBD scanning tip in needle form must be durably connected to the tip of the SPM sensor. DE 198 25 404 A1 discloses the production of an EBD scanning tip on an SPM sensor, grown on by electron beam induced deposition, and methods for fastening/anchoring it. The EBD scanning tip is stabilized by additional supporting structures, likewise produced by electron beam induced material deposition, which are deposited on the surface of the sensor tip and laterally support the actual measuring tip. The practical use of sensors produced in this way shows that this fastening method does not adequately stabilize the grown-on EBD scanning tips and that the EBD scanning tips often become detached from the surface of the sensor tip during measurement.

EP 1 278 055 A1 discloses an SPM sensor which has at its sensor tip a scanning tip formed as a "carbon nanotube". The nanotube is produced in a process of its own and fastened in a hole in the substrate of the sensor tip. It has a cylindrical form with a typical diameter of 1-10 nm. The fastening may take place by means of an electron beam induced coating or by electron beam induced or current flow induced thermal fusion on the substrate.

WO 00/19494 discloses a method for producing "nanoholes" in substrates of SPM sensors for the fastening of carbon nanotubes which have a diameter of 1-10 nm. In this case, a hole that is larger than the diameter of the nanotube is first created and then the diameter of the hole is adapted to the diameter of the nanotube by coating its wall.

The present invention is therefore based on the object of proposing an SPM sensor which has a greater stability and resistance of the deposited EBD scanning tips, and consequently a longer service life.

SUMMARY OF THE INVENTION

The object is achieved according to the invention by an SPM sensor and a method as set forth below.

According to the present invention, the EBD scanning tip of the sensor tip is anchored directly in the substrate of the sensor tip. The deposition of the EBD scanning tip begins, in particular, not on the surface of the sensor tip but inside the substrate of the sensor tip.

In an advantageous embodiment of the invention, the EBD scanning tip is anchored in the substrate of the sensor tip with positive and nonpositive engagement. As a result, the anchoring of the EBD scanning tip is so stable that the EBD scanning tip does not require any additional, laterally acting fastening or supporting structures that support the EBD scanning tip in needle form against the surface of the sensor tip.

An advantageous form of the invention provides that the sensor tip has a hole in which the EBD scanning tip is anchored. The EBD scanning tip positively engages in the hole. The lateral surface of the hole forms an abutment for the EBD scanning tip and absorbs the shearing forces occurring during the scanning of the specimen. The hole for anchoring the EBD scanning tip may be in line with the center axis of the sensor tip or be arranged laterally offset in relation to the center axis.

According to the invention, the anchoring of the EBD scanning tip takes place on the bottom and/or the walls of the hole. The EBD scanning tip is produced directly in the hole by beam induced deposition, the deposition beginning on the bottom and the walls of the hole. In this way, a positive connection is established between the EBD scanning tip and the sensor tip.

According to the method, a sensor of this type is produced as follows:

For building up and anchoring an EBD scanning tip, an SPM sensor is provided, manufactured by known production processes, usually from silicon or silicon nitride and glass, but also from epoxy resins, metals or carbon.

First a hole is produced in the substrate of the sensor tip for the anchoring of the EBD scanning tip. Two methods of production that are usual in industrial practice are envisaged for creating the hole. The hole may be created by photolithographic structuring and a subsequent etching process or by material removal by means of laser or particle beams. A hole with a diameter of around 100 nanometers (between 10 and 100 nanometers) is produced by the selected method in the surface of the probe or any desired substrate of any desired geometry. In the case of the first-mentioned method, the SPM sensor is provided with one or more layers, consisting for example of silicon oxide and/or silicon nitride and/or photoresist. A photolithographic step is used to create an opening in the photoresist on the sensor tip. The hole for the anchoring of the EBD scanning tip is created by wet-chemical or dry-chemical material removal or wet-chemical and subsequent dry-chemical material removal or dry-chemical and subsequent wet-chemical material removal. In the case in which particle beams are used for working the material, charged electrons or ions are accelerated after their creation and are focused on the surface of the sensor tip to be worked. The interaction of the accelerated ions with the atoms of the surface of the substrate causes atoms to be released from the surface of the substrate. In the case of gas-assisted processes, the energy of the electron beam induces an etching process, which leads to the removal of material.

This is followed by creation of the EBD scanning tip by particle beam induced material deposition, beginning in the hole that has been created. This material deposition is based on a gas induced process, which makes it possible to create structures at exactly defined locations of the surface of the substrate with great accuracy. For the gas induced deposition process, gaseous substances are specifically added by means of inlet systems. In this way, the material properties of the grown-on structures (for example hardness, conductivity) are determined by the choice of starting material. The position, dimensions and form of the deposited structure is defined by the scanning area of the particle beam and by means of the working time. The beam induced material deposition has the effect that structures of a defined geometry are grown on in the previously created holes. The holes are thereby filled and form for the EBD scanning tip "placed" on the probe tip a "buried" foundation, which increases the stability of the EBD scanning tip. Positive engagement between the deposited structure, the bottom and the side walls of the previously produced hole produces a stable connection between the deposited EBD scanning tip and the sensor tip of the SPM sensor.

The method according to the invention can be applied to any desired forms at any desired locations of the scanning tip. The scanning tip may be of a pyramidal, cylindrical or conical form and may have a tip or plateau at its end. Similarly, structures can be created on cantilevers without a scanning tip being present. The use of particle beam based production processes makes it possible to produce structures aligned at any desired angles in relation to the sensor tip both during the production of the holes and during the deposition of the EBD scanning tips. Apart from the basic configuration, in which the hole and the EBD scanning tip are aligned parallel to the center axis of the sensor tip, it is also possible to produce "tilted" configurations, in which the hole and/or the EBD scanning tip are inclined in relation to the center axis of the sensor tip. Possible for example are embodiments in which the hole runs parallel to the center axis of the sensor tip and the EBD scanning tip is inclined in relation to the center axis of the sensor tip, or the hole is inclined in relation to the center axis of the sensor tip and the EBD scanning tip runs parallel to the center axis, or the hole and the EBD scanning tip are inclined in relation to the center axis of the sensor tip.

BRIEF DESCRIPTION OF THE DRAWINGS

The invention is explained in more detail below on the basis of exemplary embodiments in conjunction with the accompanying drawings, in which.

DETAILED DESCRIPTION

Figure 1:
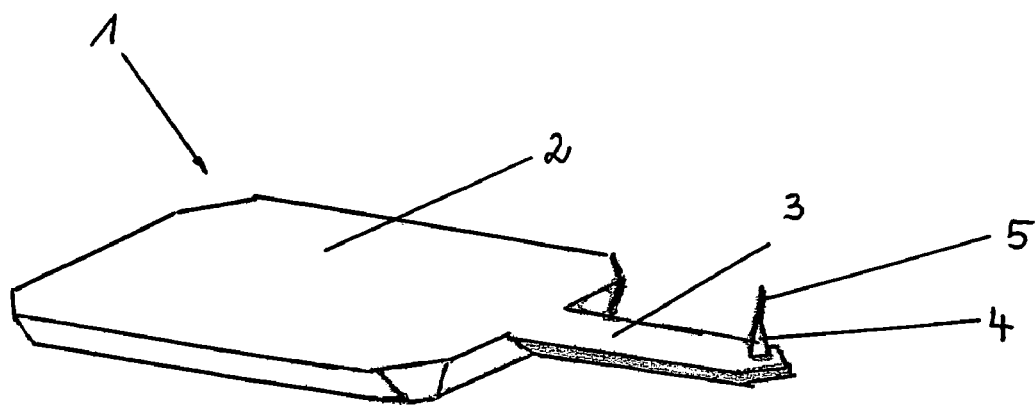
FIG. 1 shows a perspective representation of an SPM sensor with an EBD scanning tip.
Figure 2:
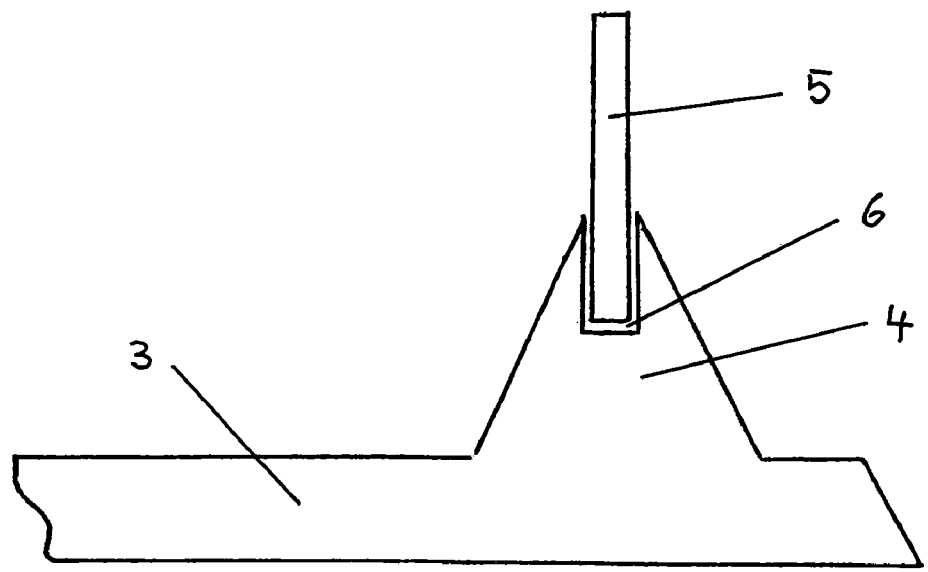
FIG. 2 shows a schematic representation of the sensor tip of the SPM sensor according to the invention with a pyramidal sensor tip.

FIG. 1 shows a schematic representation of an SPM sensor according to the invention in a perspective view. The SPM sensor for a scanning probe microscope 1 comprises a cantilever 3, a holding element 2 at one end of the cantilever 3 and a sensor tip 4 at the other end of the cantilever 3 and an EBD scanning tip 5, protruding from the sensor tip 4. The holding element 2 serves for receiving and fastening the SPM sensor 1 on a measuring head (not represented) of a scanning probe microscope. The cantilever 3 bears the sensor tip 4 with the EBD scanning tip 5 anchored in it, with which a surface (not represented) of a specimen is scanned. The holding element 2, the cantilever 3 and the sensor tip 4 are typically produced in one piece from silicon, or in more than one piece from silicon, silicon oxide, silicon nitride, glass, metals, carbon and/or epoxy resins. The EBD scanning tip 5 engages positively and/or integrally and/or nonpositively in a hole 6 in the substrate of the sensor tip 4. The hole 6 is created by material removal in the substrate of the sensor tip 4. The hole 6 is preferably arranged concentrically and parallel to the center axis of the sensor tip 4 and has a round form. The hole 6 may also run in such a way that it is offset in relation to the center axis of the sensor tip 4 and/or inclined in relation to the center axis of the sensor tip 4.

Figure 3:
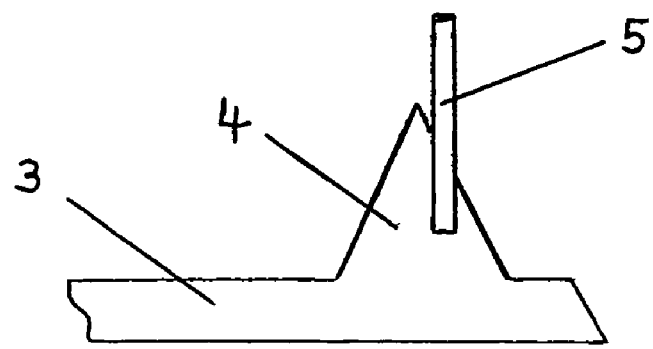
FIG. 3 shows a schematic representation of the sensor tip according to FIG. 2 with an EBD scanning tip offset in relation to the center axis of the sensor tip.

FIG. 3 shows an embodiment in which the EBD scanning tip 5 is arranged offset in relation to the center axis of the sensor tip 4.

Figure 4:
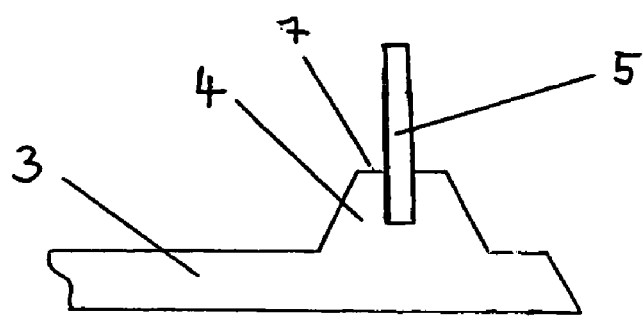
FIG. 4 shows a schematic representation of the sensor tip of the SPM sensor according to the invention with a pyramidal sensor tip with a plateau.

In FIG. 4, a sensor tip 4 which has a plateau 7 is represented. The hole 6 and the EBD scanning tip 5 are arranged on the plateau 7 of the SPM sensor 1.

Figure 5:
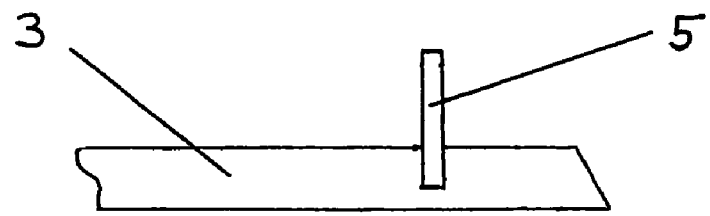
FIG. 5 shows a schematic representation of the sensor tip of the SPM sensor according to the invention on a cantilever without a pyramidal tip.

FIG. 5 shows an embodiment without a sensor tip 4, in which the EBD scanning tip 5 is anchored directly in the substrate of the cantilever 3.

What is claimed is:

1. An SPM sensor (1) comprises a cantilever (3), a holding element (2) at one end of the cantilever (3), a sensor tip (4) at the other end of the cantilever (3) and an at least partially cylindrical electron beam induced deposition (EBID or, shorter, EBD) scanning tip (5) protruding from the sensor tip (4), wherein the sensor tip (4) has a hole (6) having a bottom and a wall, wherein the EBD scanning tip (5) is directly anchored in the hole (6) on the bottom and on the wall of the hole (6).

2. The SPM sensor as claimed in claim 1, wherein the EBD scanning tip (5) is anchored in the substrate of the sensor tip (4) with positive and nonpositive engagement.

3. The SPM sensor as claimed in claim 1, wherein the hole (6) for the anchoring of the EBD scanning tip (5) is arranged offset in relation to a center axis of the sensor tip (4).

4. The SPM sensor as claimed in claim 1, wherein the EBD scanning tip (5) is created directly in the hole (6) by beam induced material deposition.

* * * * *